US008843475B2

(12) United States Patent
Marshall

(10) Patent No.: US 8,843,475 B2
(45) Date of Patent: Sep. 23, 2014

(54) SYSTEM AND METHOD FOR COLLABORATIVE KNOWLEDGE STRUCTURE CREATION AND MANAGEMENT

(76) Inventor: Philip Marshall, Portland, OR (US)

(*) Notice: Subject to any disclaimer, the term of this patent is extended or adjusted under 35 U.S.C. 154(b) by 594 days.

(21) Appl. No.: 11/827,563

(22) Filed: Jul. 11, 2007

(65) Prior Publication Data

US 2008/0046450 A1 Feb. 21, 2008

Related U.S. Application Data

(60) Provisional application No. 60/830,434, filed on Jul. 12, 2006.

(51) Int. Cl.
*G06F 17/30* (2006.01)
*G06N 5/02* (2006.01)

(52) U.S. Cl.
CPC ............ *G06N 5/02* (2013.01); *G06F 17/30734* (2013.01)
USPC ............ 707/722; 707/725; 707/731; 707/794

(58) Field of Classification Search
CPC .......... G06F 17/3089; G06F 17/30731; G06F 17/30864; G06F 17/30991
USPC ........................... 707/725, 731, 706, 737, 794
See application file for complete search history.

(56) References Cited

U.S. PATENT DOCUMENTS

| | | | |
|---|---|---|---|
| 6,138,085 A * | 10/2000 | Richardson et al. | 704/1 |
| 6,167,370 A | 12/2000 | Tsourikov et al. | |
| 6,189,002 B1 | 2/2001 | Roitblat | |
| 6,618,727 B1 * | 9/2003 | Wheeler et al. | 1/1 |
| 6,678,677 B2 | 1/2004 | Roux et al. | |
| 6,810,376 B1 | 10/2004 | Guan et al. | |
| 7,089,236 B1 * | 8/2006 | Stibel | 707/705 |
| 7,200,592 B2 * | 4/2007 | Goodwin et al. | 706/46 |
| 7,801,896 B2 * | 9/2010 | Szabo | 707/739 |
| 8,019,749 B2 * | 9/2011 | Leban | 707/713 |
| 2002/0022955 A1 | 2/2002 | Troyanova et al. | |
| 2002/0032735 A1 * | 3/2002 | Burnstein et al. | 709/204 |
| 2002/0059220 A1 * | 5/2002 | Little | 707/705 |
| 2002/0065857 A1 | 5/2002 | Michalewicz et al. | |
| 2005/0015399 A1 * | 1/2005 | Melo et al. | 707/707 |
| 2005/0065920 A1 * | 3/2005 | He et al. | 707/707 |
| 2005/0160107 A1 * | 7/2005 | Liang | 707/707 |
| 2006/0235696 A1 * | 10/2006 | Bennett | 704/270.1 |
| 2006/0256739 A1 * | 11/2006 | Seier et al. | 370/261 |
| 2007/0055656 A1 * | 3/2007 | Tunstall-Pedoe | 707/3 |
| 2007/0112742 A1 * | 5/2007 | Dumais et al. | 707/707 |
| 2007/0271228 A1 * | 11/2007 | Querel | 707/707 |
| 2008/0010266 A1 * | 1/2008 | Brunn et al. | 707/5 |
| 2008/0306959 A1 * | 12/2008 | Spivack et al. | 707/9 |
| 2010/0057815 A1 * | 3/2010 | Spivack et al. | 707/794 |
| 2010/0332583 A1 * | 12/2010 | Szabo | 709/202 |

* cited by examiner

*Primary Examiner* — Robert Beausoliel, Jr.
*Assistant Examiner* — Alexandria Bromell
(74) *Attorney, Agent, or Firm* — Alleman Hall McCoy Russell & Tuttle LLP

(57) ABSTRACT

A collaborative, semantic-based knowledge structure creation and management system and method are provided. The system and method may include knowledge structures which include concept based maps which may be linked according to topic, relationship types, conceptual equivalence, and temporally. The knowledge structures may be managed by users, wherein users may perform at least one of adding a new concept, creating a new relationship, confirming an existing relationship, and breaking an existing relationship.

18 Claims, 10 Drawing Sheets

SYSTEM AND METHOD FOR COLLABORATIVE KNOWLEDGE STRUCTURE CREATION AND MANAGEMENT

CROSS-REFERENCE TO RELATED APPLICATION

This application claims the benefit of U.S. Provisional Patent Application Ser. No. 60/830,434 filed Jul. 12, 2006, which is hereby incorporated by reference in its entirety for all purposes.

BACKGROUND AND SUMMARY

Recently, a vast amount of information about a multitude of different types of topics has become accessible through searches using search engines on networks. Some search engines have been configured to provide fast responses to search requests while retrieving highly clustered and indexed sets of links. The links may be prioritized by the number and kind of websites that link to them. These types of search engines may perform different website identification and organization, for example, web crawling, sorting and normalizing website links, and prioritizing website links.

In some situations, the search engines may provide results which are either too narrow, providing only a small number of websites with meaningful content, or too broad, providing a quantity of websites so large that it may become cumbersome trying to search every website for meaningful content. Furthermore, search engines generally do not provide orientation around a topic, and even searches on synonymous words for the same topic can produce drastically different results. And since search results are generally not oriented by topic, the ability to navigate between related topics may not be available.

Some emerging search engine technologies, such as Google Co-op, are, however, beginning to enable humans to index websites with certain topic-specific metatags that then facilitate topic-to-topic navigation. Related is the way in which systems, such as inventory systems, organize data. While historically these systems have relied upon proprietary database schemas to store data, enabling retrieval through proprietary search queries, emerging information retrieval technologies are enabling faster retrieval of this information and even more intuitive display through the use of synonyms and topic-to-topic relationships and navigation.

Thus, due to the emergence of search technologies that utilize synonyms and topic-to-topic relationships to facilitate better information retrieval and display, there is a need for a system and method that can facilitate the creation of definitive, trusted "knowledge structures" of synonyms between terms for a given topic, and of reltionships between topics. Such a system and method used to formalize a knowledge structure might be used by a person or groups of persons considered trusted to establish such structures, or might be used in a more open, collaborative way, enabling a large number of users of a network to formalize the knowledge structures through more mathematical formalization processes.

For example, knowledge structures may be created by a group of networked individuals using the knowledge structure creation and management system, and the resulting knowledge structures may then be used to facilitate information retrieval, such as for use in a search system or in an inventory management system.

In one aspect of the system, concepts and events may be linked temporally via the knowledge structures and searching the knowledge structures may result in a timeline of events that may be displayed to a user. The timeline may include events that relate to a concept temporally and according to other relationship types. The temporal linking of concepts may facilitate intuitive searching between concepts that may be linked through time.

Further, in another aspect of the system, users may continuously manage the system by revising knowledge structures within the system. Knowledge structures may be updated by creating or changing links between elements, adding new elements, removing links, and removing elements. Moreover, the management process may be conducted through the collaborative efforts of users of the system.

BRIEF DESCRIPTION OF DRAWINGS

The disclosure is illustrated by way of example and not by way of limitation in the figures of the accompanying drawings, in which the like references indicate similar elements and in which.

DETAILED DESCRIPTION

Systems and methods to create collaborative semantic-based knowledge structures are described below. Although the systems and methods of searching may be described in one example in regards to searching websites on a network, it should be appreciated that such systems and methods may be used in a variety of environments, including, but not limited to, logistical operations, marketing and advertising, law enforcement, etc. and used as part of general information retrieval or within specialized areas such as law enforcement, auto parts, or insurance.

Figure 1:
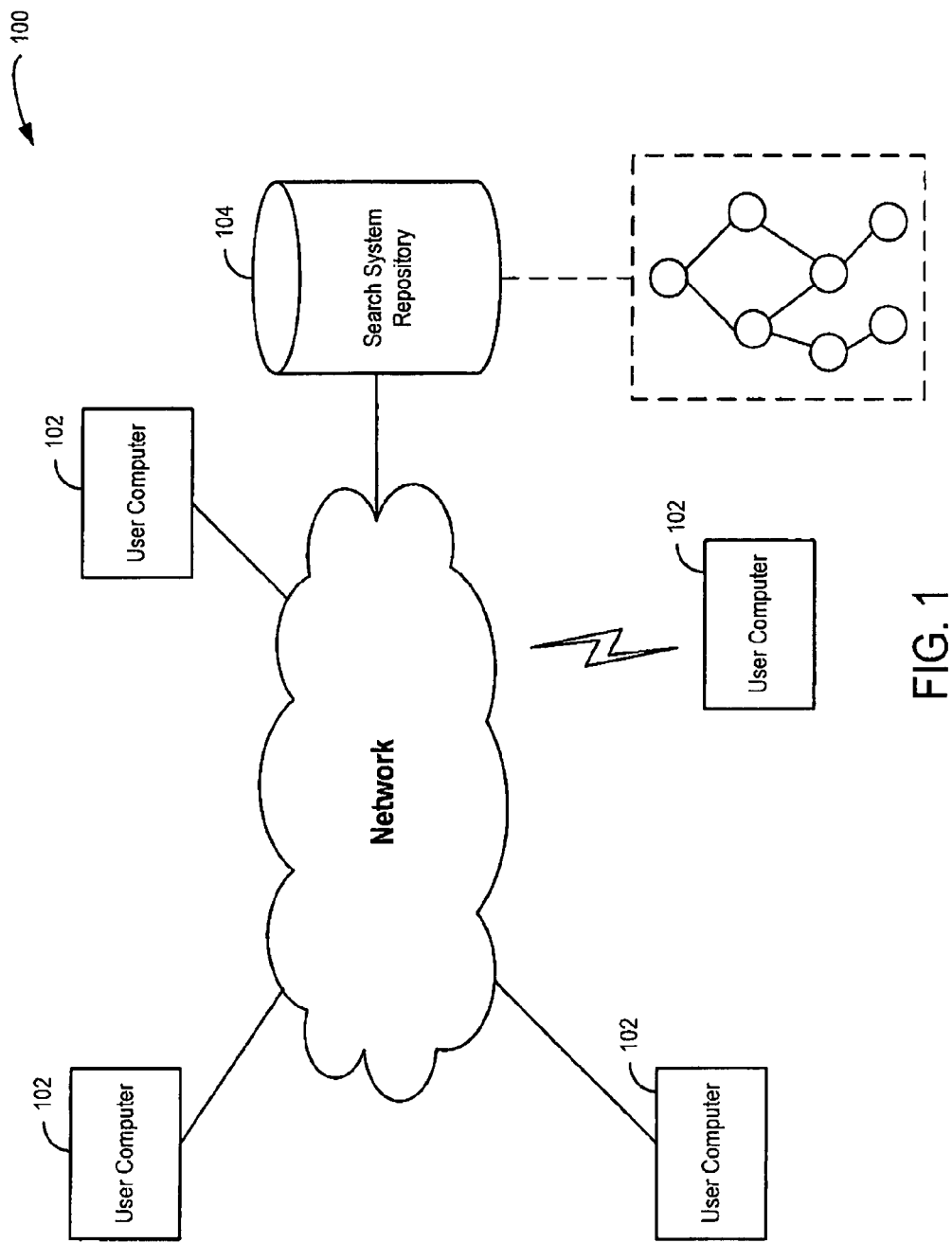
FIG. 1 is a schematic representation of a network in which an exemplary embodiment of the knowledge structure creation and management system of the present disclosure may be implemented.

FIG. 1 illustrates a schematic diagram of a network in which an exemplary embodiment of a collaborative semantic-based knowledge structure creation and management system of the present disclosure may be implemented. The network (generally referenced as 100) includes a plurality of user computing devices (alternatively referred to as user computers) 102. The user computing devices 102 may be any sort of device capable of connecting to and communicating with the network 100, for example, a desktop computer, a laptop computer, a personal digital assistant, a smart phone, etc. Furthermore, the network 100 may include one or more repositories 104 which may be in communication with the user computers 102.

It should be appreciated that an exemplary embodiment of the knowledge structure creation and management system, which may be used by a search system in one example, may be implemented on a variety of different networks, including public networks, private networks, shared networks, etc. For example, the knowledge structure creation and management system may be configured for use with searching for information stored on a public network system such as the World Wide Web or Internet, a private system such as an intranet network, or an individual computer. Furthermore, the knowledge structure creation and management system may be configured for use with searching for information on newsgroups, open directories, miscellaneous databases, etc.

In the exemplary knowledge structure creation and management system, users may perform search queries to repositories on the network in order to retrieve information stored in the repositories. Stored information may relate to any sort of data that may be conceptually organized, including, but not limited to, website identifier information, personal information, geographical information, etc.

Information stored in the repositories may be organized such that, for example, terms, phrases, and other data strings may be categorized into concepts (alternatively referred to as topics). These concepts may be semantically linked together through taxonomic relationships. For example, a concept may be linked to a multitude of other concepts based on the type of relationships that exist between the concepts. In some embodiments, the concepts may be linked temporally, and/or linguistically, such as an identification of synonymic concepts. Accordingly, the linked concepts may produce an array of semantic maps, which may be traversed by search queries.

Furthermore, the semantic maps may be used to define structured filters (alternatively referred to as knowledge structures) that may aid in information retrieval. For example, the semantic organization of concepts may enable concept-based browsing, and cross-referencing to types or subtypes of concepts. As another example, a search query, using the structured filter approach may return results pertaining to a particular topic and, in addition, may return people, places, and products relating to the topic. As another example, a search query may return temporally linked concepts organized in chronological order. In an exemplary embodiment of the knowledge structure creation and management system, concepts and related information may be more accessible to a user due to the filtering achieved by the knowledge structures that may correlate concepts and terms according to the preferences of user of the knowledge structure creation and management system.

In some embodiments of the knowledge structure creation and management system, a knowledge structure may be created by one or more users who may link different elements to a particular topic. As an example, a particular knowledge structure may start as a single topic linked to several related topics. Further, users of the system may collaboratively expand the knowledge structure during use of the system by adding additional elements and/or links. As a knowledge structure is developed based on user interaction, a map of conceptually linked topics may be created, wherein users of the system may traverse the concept-based map to filter terms and concepts in order to retrieve information while browsing a particular topic.

An exemplary knowledge structure system further may enable users to continuously manage various knowledge structures in the system. For example, in some embodiments, the system may enable users to change or remove established links between synonyms (intra-concept), between topics (inter-concept), and/or temporally. Additionally, the system may enable users to remove particular elements if desired.

Moreover, in some embodiments, the system may enable users to completely remove entire knowledge structures from the system if desired. Furthermore, various knowledge structure system configurations and use examples are described in more detail below.

Figure 2:
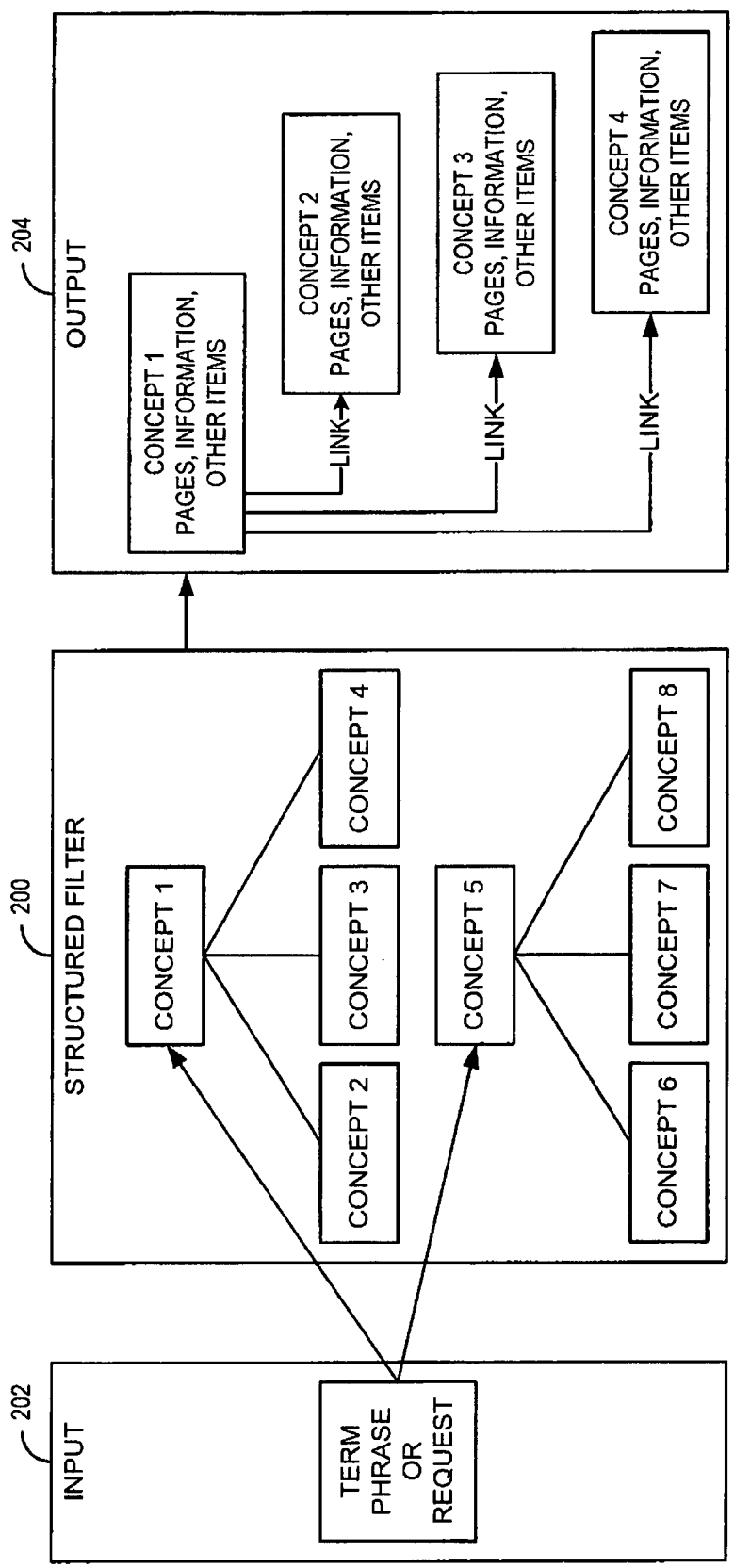
FIG. 2 is a schematic diagram of an exemplary embodiment of a knowledge structure creation and management system.

Now referring to FIG. 2, a high-level, schematic representation of an exemplary knowledge structure 200 of the present disclosure, used in an exemplary search system, is shown. Typically a knowledge structure can be used in a search for a desired topic. A user may create an input 202, for example, a text string such as a term, phrase, or request. The input 202 may be converted into a query of the repository. The query may be filtered through the knowledge structure 200 in order to retrieve a conceptual match to the query. Furthermore, the resulting conceptual match may be produced as an output 204, along with other topics linked to it within the knowledge structure.

It should be appreciated that in some embodiments, the input 202 may include visual elements, graphics, audio excerpts, etc. Accordingly, the system may produce conceptual matches represented by visual elements, graphics, audio excerpts, etc.

With use of the knowledge structure creation and management system, the system may enable an input query to be mapped to concepts within a knowledge structure. The input query may traverse linked elements throughout a semantic map while filtering desired conceptual results. For example, the structured filter may retrieve information which conceptually relates to the input. In the illustrated embodiment, the structured filter 200 retrieves two concepts (Concept 1 and Concept 5) determined to be conceptually related to the input query. The knowledge structure creation and management system may output the retrieved concepts, and additionally, the output may include other concepts (Concept 2-4 linked to Concept 1; Concept 6-8 linked to Concept 5) including multiple sub-level concepts which may be linked to the retrieved concepts. For example, a concept retrieved by a search may be related to multiple concepts on a first sub-level, and further may have relationships to other concepts on second, third, fourth, etc. sub-levels. In some embodiments, the sub-levels of additional concepts may be organized in the output according to relationship type.

Figure 3A:
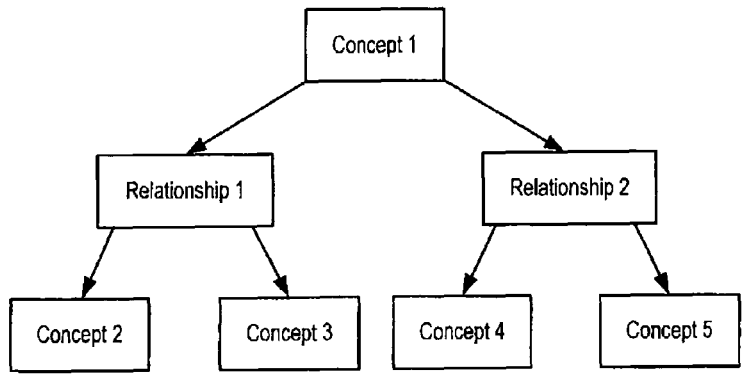
FIGS. 3A-3C are schematic representations of partial semantic maps of a knowledge structure creation and management system.

FIG. 3A shows another example of a schematic representation of a semantic map of concepts linked according to types of conceptual relationships illustrating use of a knowledge structure. In the illustrated embodiment, for example, a structured filter may retrieve a concept (Concept 1) which may be linked to two additional concepts (Concept 2 and Concept 3) through a first type of relationship (Relationship 1) and two more additional concepts (Concept 4 and Concept 5) through a second type of relationship (Relationship 2). Some example relationship types may include, but are not limited to, type of, is part of, is manufactured by, transports, works for, was before, occurred before, occurred after, etc.

The above described use of the exemplary knowledge structure creation and management system may include semantic maps of concepts organized according to conceptual relationship type. However, it should be appreciated that in some embodiments of the knowledge structure creation and management system, a structured filter may be organized by conceptual equivalence (i.e. synonym) and/or temporally.

Moreover, a user or group of users may create knowledge structures comprising of synonyms for a given topic and/or may create the knowledge structures comprising of relationships between topics. Examples of such creation and/or management of knowledge structures are described in more detail below.

Figure 3B:
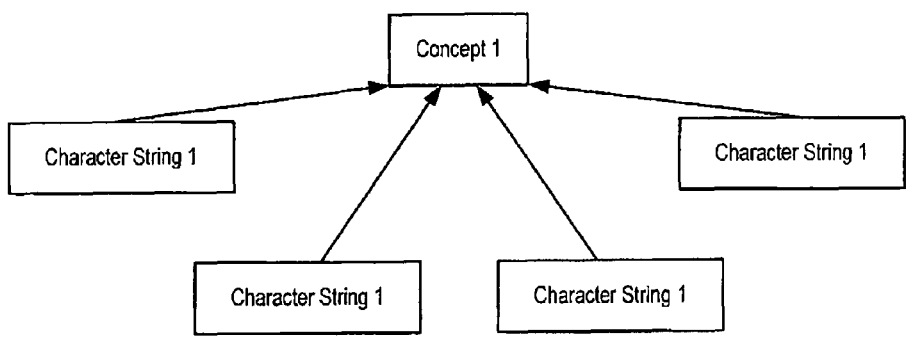

Referring to FIG. 3B, a nonlimiting example of a partial semantic map organized by conceptual equivalence is shown. In the illustrated embodiment, an input query may be mapped to a concept (Concept 1) which is linked to four character strings (Character Strings 1-4) based on conceptual equivalence. In other words, the system may map an input query to a concept within a knowledge structure, and the system may then retrieve and output the concept as well as the character strings that are synonymous with the concept. The knowledge structure creation and management systems determination of conceptual equivalence between two character strings will be discussed in more detail below.

Figure 3C:
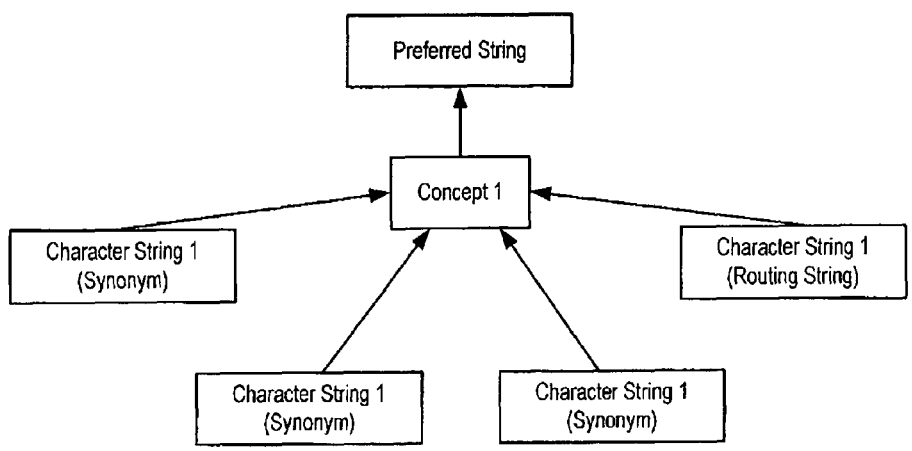

FIG. 3C shows another example of a partial semantic map organized by conceptual equivalence. As shown, a concept may be linked to four character strings. Three of the character strings may be classified as synonyms and the fourth character string may be classified as a routing string. A routing string may not represent the exact meaning of a concept but may often be employed by users when trying to identify a concept, for example a euphemism or colloquialism.

Additionally, in some embodiments, the concept may be linked to a preference string which may be a character string with is determined to have a priority level of audience preference when representing the concept. In some cases, the preference string may be established through use of the structured filter and output may be continuously refined according to user preference. In one particular example, a preference string may be established based on user clicks corresponding to a retrieved concept. Furthermore, a concept may have multiple levels and sub levels of prioritized strings. In some embodiments, audience preference may include the collaborative actions and intentions of multiple users of the knowledge structure creation and management system.

In some embodiments, a knowledge structure may be configured such that text strings may be mapped into concepts or topics, such as, for example synonyms, preferred strings, routing strings, and temporal strings. Knowledge structures with such a configuration may be characterized as having intra-topic mappings. Further in some embodiments, a knowledge structure may be configured such that topics may be mapped to multiple other topics through various types of relationships. Knowledge structures with such a configuration may be characterized as having inter-topic mappings.

In some embodiments of the knowledge structure creation and management system, users may dynamically manage knowledge structures of the system by using various management tools to modify a particular knowledge structure. For example, the system may be configured with an online tool. The tool may be used to query a knowledge structure to retrieve information.

In some embodiments, the tool further may be configured to enable a user to directly confirm or break a relationship between two concepts within the knowledge structure. For example, a user may perform a search for a character string using the tool. The search may return several conceptually equivalent, synonymous, and/or temporal character strings. The knowledge structure creation and management system may be configured to enable the user to determine if the returned character strings, do in fact, have a legitimate relationship. The user may have the ability to confirm or break the link between the searched character string and the retrieved concepts. In an exemplary embodiment of the knowledge structure creation and management system, users may determine which concepts may be linked together and through which type of relationship they may be linked. Furthermore, groups of users may collectively manage the knowledge structure system by making determinations about included elements and links.

Additionally, in some embodiments the system may include tools to add or remove various knowledge structures. Thus, collaboratively, users of the knowledge structure creation and management system may contribute to the management of knowledge structures within the system.

Furthermore, users of the knowledge structure creation and management system may continuously expand or contract the semantic mapping of concepts in a structured filter. For example, if a user is searching for a concept and nothing is retrieved by the knowledge structure creation and management system, the system may prompt a user to add a new concept. In turn, the user may propose a new concept to be added to the semantic map. Additionally, a user may propose that new links be created between concepts if they do not exist in a particular knowledge structure. Conversely, if a user finds that two concepts are linked together and determines that the link is not legitimate, the user may propose to break the link between the concepts. User proposals may be formalized in the knowledge structures according to different establishment or breaking criteria described herein.

Figure 4:
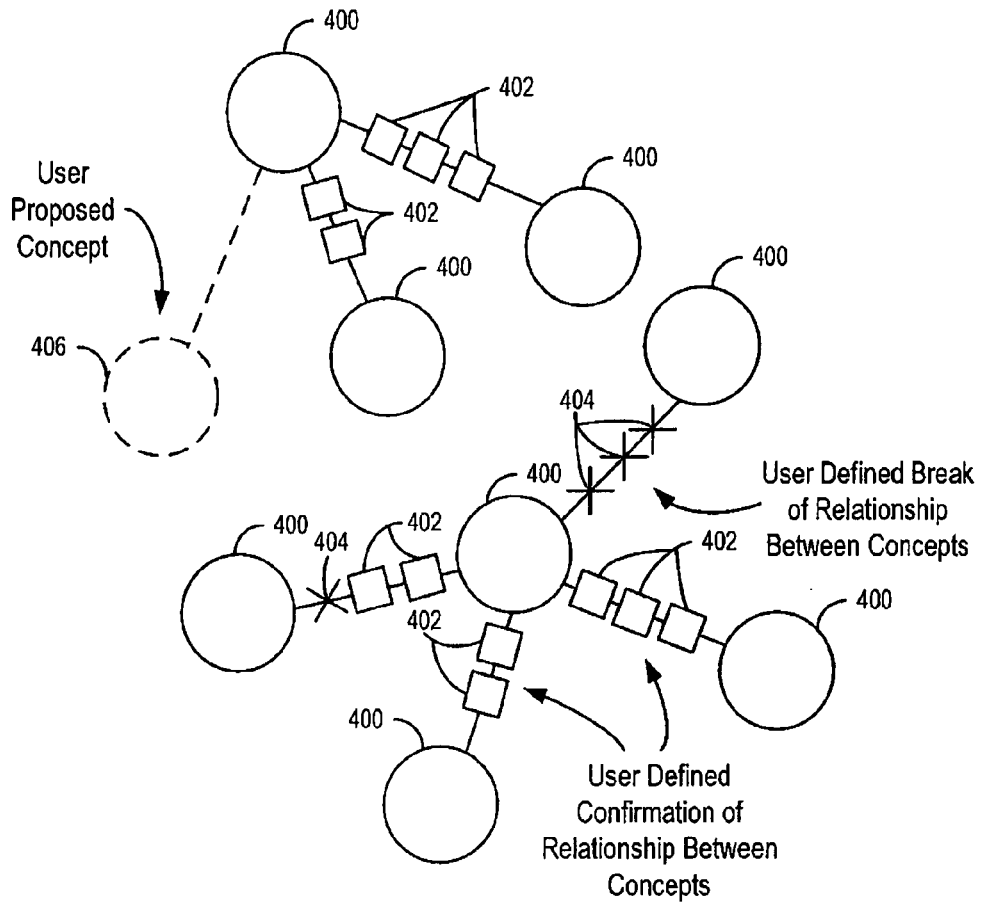
FIG. 4 is a schematic representation of concepts linked together based on user characterizations.

Referring now to FIG. 4, a schematic representation of a partial semantic map is shown with user defined confirmations or breaks of links between concepts. In the illustrated embodiment, concepts 400 are shown linked to one another. For each link a user may propose to confirm the link or break the link. In other words, users may cast votes to create or break relationships between concepts. As shown, the user proposed confirmations of a link are depicted as squares 402, while user proposed breaks are depicted as crosses 404. Furthermore, users may propose new concepts 406 and links, which are shown in dashed lines. In one example, three proposed linkages (squares) may be required to confirm the link and three proposed breaks (crosses) may be required to break the link in an open model, whereas only a single proposed linkage may be required to confirm the link and one proposed break may be required to break the link in a trusted model.

As described above, in some embodiments, the knowledge structure creation and management system may determine a preference string to represent a concept as a conceptual equivalent. A preference string may be a string with a high level of priority based on audience preference when representing a concept. In other words, the priority level of a preference string may be determined by the amount of user proposals for a particular concept. Specifically, for example, if a concept is linked to multiple synonyms then the synonym with the most user confirmations may be determined to be the preference string for the concept.

In some embodiments the knowledge structure creation and management system may include different types of users.

Figure 5:
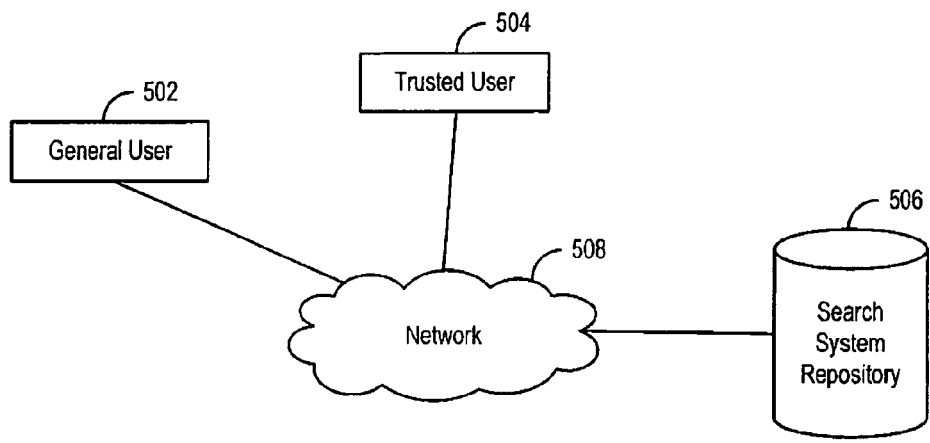
FIG. 5 is a schematic representation of a network in which an exemplary embodiment of the knowledge structure creation and management system includes different types of users.

As shown in FIG. 5, for example, a general user 502 and a trusted user 504 may utilize an exemplary knowledge structure creation and management system and may search a knowledge structure creation and management system repository 506 over a network 508. Within the system, the trusted user may be able to create changes in a knowledge structure, for example, create or break links between concepts and add new concepts directly without having to collaborate with others to formalize the change. Thus, in some cases, the establishment criteria for the trusted user may be a proposal for change of the knowledge structure. In some embodiments, the general user of the knowledge structure creation and management system may be permitted to support proposed linkages or breakages in links between concepts, and may proposed new concepts and/or links. However, the general user may only contribute to a model of formalization for a concept because the system may require that multiple general users propose a linkage or break until a mathematical threshold of like proposals is met, thereby formalizing the change or addition. Thus, in some cases, the establishment criteria for the general user may be affirmation of a proposal from one or more users. In this way, general users may collaborate to create and manage one or more knowledge structures. Moreover, changes in the knowledge structure may be formalized according to establishment criteria including for example a plurality of similar proposal that may exceed a mathematical threshold.

Another exemplary embodiment of the knowledge structure creation and management system may employ a model of formalizing inter-concept mappings that may be more automated. Also, an exemplary embodiment may include less deliberate manual modeling by users to manage knowledge structures in the system. In such a model, for example, users of a search system may navigate particular paths to certain content following their search, such as navigating to sub-types of a topic. In one configuration, the system model may utilize the frequency of navigation to those sub-types to formalize the relationship of those topics as sub-types of the originally searched-upon topic.

For example, users of a search system may search and retrieve information about a famous singer, and then navigate through a link called "songs" to that singer's musical works. If a defined mathematical threshold is met based on the number of users navigating such links, then the knowledge structure will create a relationship between the "songs" and the "singer" through a relationship called "songs of" or "performed by".

It should be appreciated that in some embodiments, an automated model may be used in combination with a mathematical threshold model (discussed above) or a trusted user model (discussed below) to formalize elements in a knowledge structure creation and management system.

In some embodiments of the knowledge structure creation and management system, a group of trusted users may act as managers of the knowledge structure creation and management system and may have additional organizational and administrative privileges. A user may be deemed a trusted user for a variety of reasons, such as being an expert on a particular topic, working as part of the knowledge structure creation and management system operational management team, etc. In the trusted user model, a trusted user may modify a knowledge structure, for example add new concepts and create or break links between concepts without collaboration of other users to formalize the modification. The trusted user model may assume that the trusted user may have expertise in a particular topic and therefore may be granted additional management privileges.

In some embodiments of the knowledge structure creation and management system, both the general user model and the trusted user model may be employed. In such a system, general users may propose various additions and/or modifications to the knowledge structures that require collaborative support of other users to formalize the modification. Whereas, trusted users of the system may propose various additions and/or modifications to the knowledge structures and the modifications may be formalized without further support of other users. In other words, trusted users may make direct changes to the knowledge structure creation and management system; while general users may be limited to making proposals to change the knowledge structure creation and management system.

In some embodiments, when a general user proposes a change to the knowledge structure creation and management system, the general user may cast a vote to make the change. The votes (proposed changes) of general users may be tallied for each link or concept in the semantic map. Once a vote tally reaches a particular mathematical threshold, a relationship between concepts may be confirmed or broken, or a new concept may be added to the semantic map. In some embodiments, different mathematical thresholds may exist for different aspects of the knowledge structure creation and management system. It should be appreciated that in some embodiments, proposed changes made by general users may be accepted according to a statistically significant formalization, or other determining factors.

Figure 6:
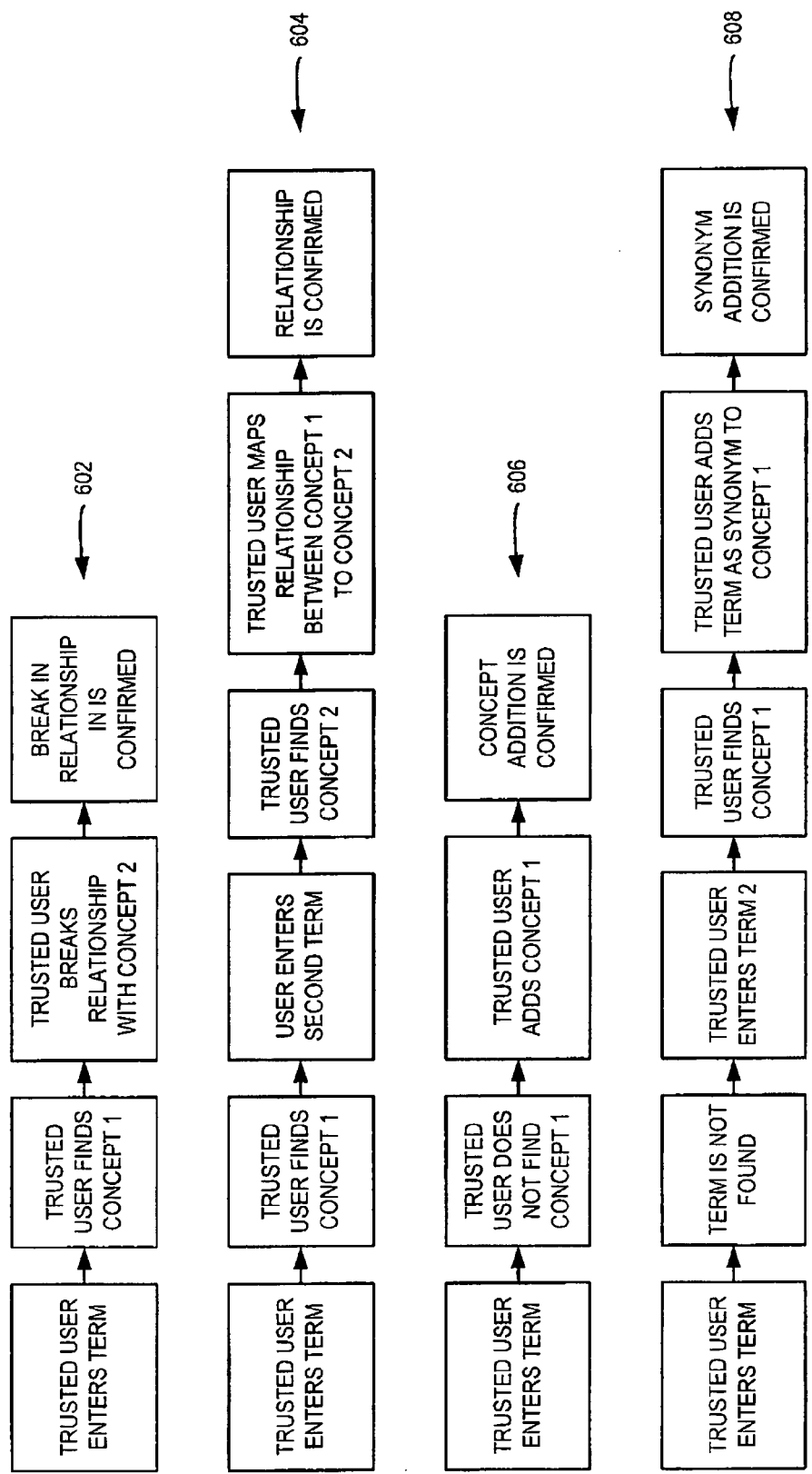
FIG. 6 shows example search processes performed by a trusted user of the knowledge structure creation and management system of FIG. 5.

Now referring to FIG. 6, four examples of a trusted user's process of creating and/or managing (e.g. modifying) a knowledge structure is described. In a first input 602, a trusted user may enter a term in a search query, for example, of the knowledge structure creation and management system. The trusted user may retrieve a concept which is linked to a second concept. Further, the trusted user may choose to break the relationship between the first and second concept. Thus, since the user is a trusted user the break in relationship is formalized in the knowledge structure creation and management system.

In a second input 604, the trusted user may enter a first term in a search query of the knowledge structure creation and management system. The trusted user may find a first concept correlating with the first search term. Further, the trusted user may enter a second search term into a search query of the knowledge structure creation and management system and may retrieve a second concept which correlates to the second search term. The trusted user may link the first concept to the second concept through a relationship. Thus, since the user is a trusted user the relationship between concepts is formalized in the knowledge structure creation and management system.

In a third input 606, the trusted user may enter a term into a search query of the knowledge structure creation and management system. The search query does not return a concept. Accordingly, the system may prompt the trusted user to add a concept. The trusted user may add a concept and links to the concept to the semantic map. Thus, since the user is a trusted user the semantic map of the knowledge structure creation and management system is expanded to include the new concept and associated links.

In a fourth input 608, the trusted user may enter a first term into a search query of the knowledge structure creation and management system. The first term may not be found in the knowledge structure creation and management system. Accordingly, the system may prompt the trusted user to enter a new search query (although is will be appreciated that the system may optionally or additionally prompt the trusted user to add a new concept). The trusted user may enter a second term into a search query of the knowledge structure creation and management system. The trusted user may find a concept related to the second search term. Further, the trusted user may add a link between the first search term and the second search term as well as add a "synonym" type link between the first search term and the concept. Thus, the synonym is linked to the concept in the knowledge structure creation and management system.

Note that such management of a knowledge structure is not limited to information gained through searching, but rather these are examples of how a user may identify concepts that may be linked, or not linked, in the knowledge structure, expand the knowledge structure, generate synonyms, etc.

Figure 7:
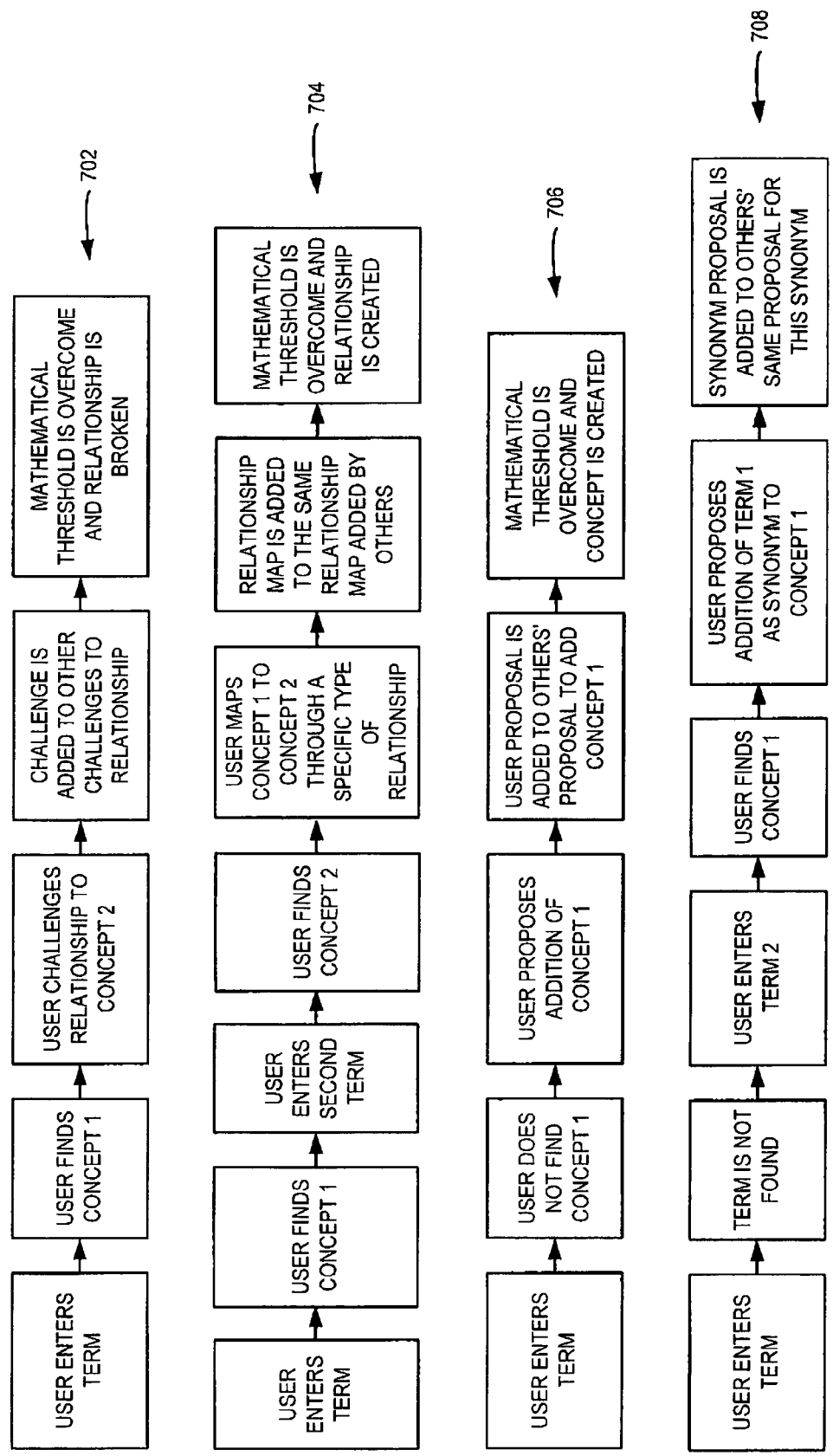
FIG. 7 shows example search processes performed by a general user of the knowledge structure creation and management system of FIG. 5.

Now referring to FIG. 7, four examples of a general user's search process is described. In a first search 702, a general user may enter a term in a search query of the knowledge structure creation and management system. The general user may find a first concept which is linked to a second concept. The general user may propose to break the relationship between the first concept and the second concept. The proposal may be added to the tally of proposals by other general users. When the tally overcomes a mathematical threshold the break in relationship may be confirmed in the knowledge structure creation and management system.

In a second search 704, the general user may enter a first term in a search query of the knowledge structure creation and management system. The general user may find a first concept correlating with the first search term. The general user may enter a second search term into a search query of the knowledge structure creation and management system and may retrieve a second concept which correlates to the second search term. The general user may propose to link the first concept to the second concept through a relationship. The proposal may be added to the tally of proposals by other general users. When the tally overcomes a mathematical threshold the relationship between concepts may be confirmed in the knowledge structure creation and management system.

In a third search 706, the general user may enter a term into a search query of the knowledge structure creation and management system. The search query may not return a concept. The general user may propose the addition of a new concept and a new link between the concept and the search query. The proposal may be added to the tally of proposals by other general users. When the tally overcomes a mathematical threshold the semantic map of the knowledge structure creation and management system may be expanded to include the new concept and associated link.

In a fourth search 708, the general user may enter a first term into a search query of the knowledge structure creation and management system. The first term may not be found in the knowledge structure creation and management system. The general user may enter a second term into a search query of the knowledge structure creation and management system. The general user may find a concept related to the second search term. The general user may propose to add the first term as a synonym to the concept. The proposal may be added to the tally of proposals by other general users. When the tally overcomes a mathematical threshold the synonym may be linked to the concept as a synonym in the knowledge structure creation and management system.

In some embodiments, the collaborative nature of the knowledge structure creation and management system may facilitate the structured filters to be validated, scalable, and maintainable by the general users and the trusted users. Furthermore, the semantic nature of the knowledge structure creation and management system may allow the use of synonyms to drive topic or concept-based searching. Likewise, the temporal nature of some systems may enable topic or concept based searching. Also, the semantic nature of the knowledge structure creation and management system may allow the use of relationships between concepts to drive topic or concept-based searching. An exemplary embodiment of the knowledge structure creation and management system further may be used to refine attributes for a character string to aid in searching, including but not limited to language. Some embodiments of the knowledge structure creation and management system may be used to replace cataloging as a reliable method of structuring topics.

The exemplary embodiment of the knowledge structure creation and management system described above may be used in a variety of different applications relating to searching on computer systems over a network, for example, the World Wide Web, a private intranet, databases etc.

In some embodiments, topics in a knowledge structure may be represented by a concept identifier and synonyms may be represented by a string identifier. In addition, some elements may be represented by an alphanumeric identifier. For example, a knowledge structure may include a map of various linked tags which point to different elements such as, for example, web pages, pictures, inventory, audio files, video content, etc. Additionally, alphanumeric identifiers may correspond to temporal relationships such as dates of conceptually linked events.

Furthermore, knowledge structures which comprise maps of different identifiers as described above may be used by external sources to browse concepts and retrieve information. For example, a search engine may utilize one or more created knowledge structures to funnel search strings into in order to acquire a particular topic. Accordingly, search engines may improve navigation between topics by applying their search queries to the knowledge structures.

In some embodiments, the knowledge structure creation and management system may enable consumers to use a computer system over a network to contribute toward a statistically-significant or mathematical "formalization" of synonyms or timelines for a topic/concept. Furthermore, an exemplary knowledge structure creation and management system may enable consumers to use a computer system over a network to contribute toward a statistically-significant or mathematical "formalization" of the preferred term or phrase that should be used for a topic/concept and for that preferred term to be able to be different by language.

Additionally, the knowledge structure creation and management system may enable consumers to use a computer system over a network to contribute toward a statistically-significant or mathematical "formalization" of relationships between topics/concepts. Moreover, the knowledge structure creation and management system may enable consumers to use a computer system over a network to contribute toward the statically-significant or mathematical "breaking" of the aforementioned terms and relationships. Thus, some embodiments of the knowledge structure creation and management system may enable browsing of website content, not just searching on website content.

Figure 8:
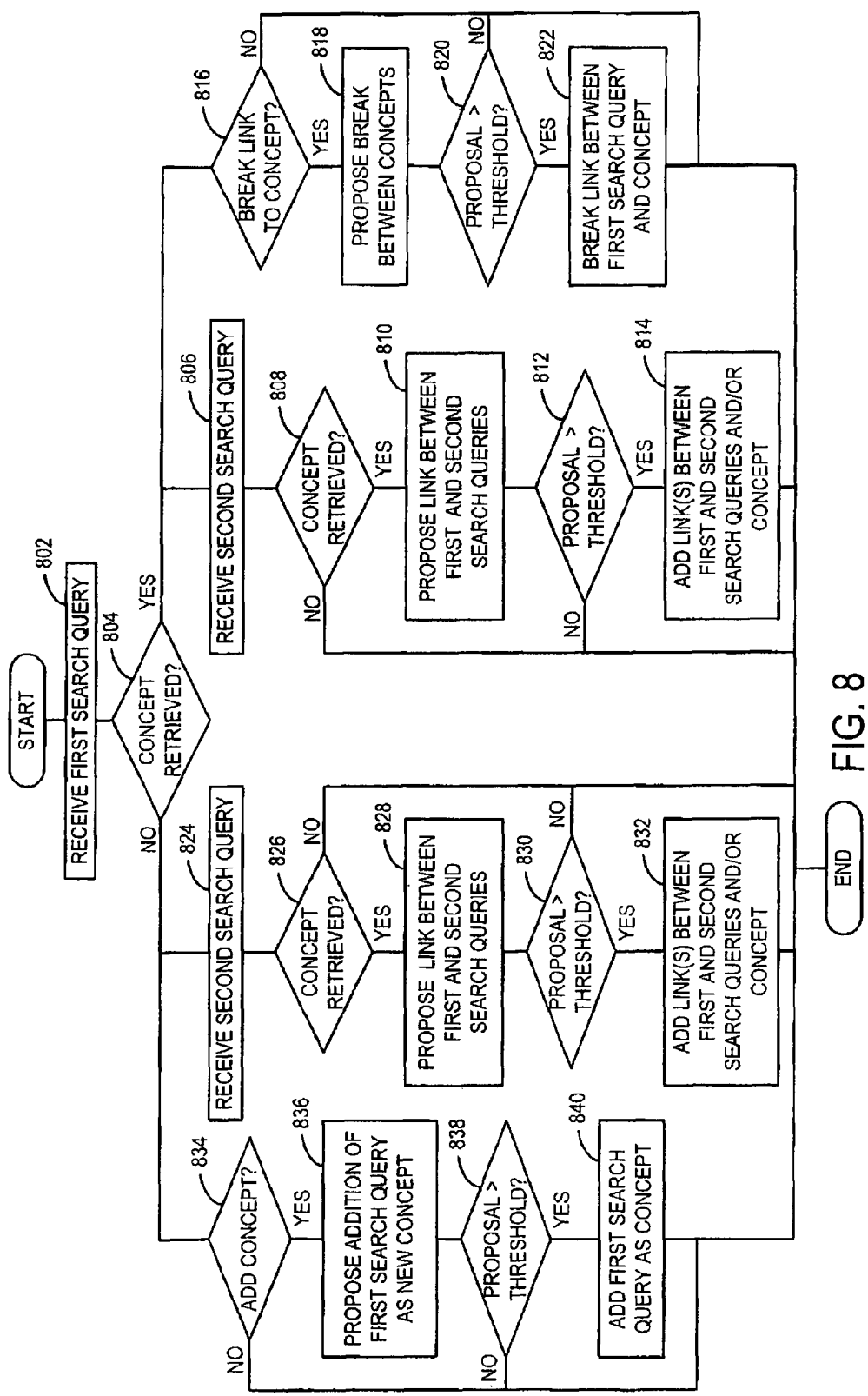
FIG. 8 shows an example flow diagram for creating and managing knowledge structures in a general user model.

FIG. 8 shows an exemplary method for creating and managing knowledge structures according to the above described general user model. In the present example, the method may be applied to concept searching, such as for example searching performed by a search engine. The method may facilitate adding new concepts as well as confirming and breaking links between concepts based on mathematical formalization based on the preferences of the general user populace.

The method begins at 802, where a first search query may be received. As discussed above the search query typically may be a text string, however it will be appreciated that the query may take other forms.

Next at 804, the search query may be filtered through the knowledge structures in an attempt to retrieve a related concept. If a concept is retrieved the method moves to 806. Otherwise, a concept is not retrieved and the method moves to 824.

Upon retrieving a concept that relates to the first search query, a user may be presented with several knowledge structure maintenance options. First at 806, the user may be prompted to enter a second search query based on the retrieved concepts from the first search query. At 808, the second search query may be filtered through the knowledge structures in an attempt to retrieve a related concept. If a concept is retrieved, the method moves to 810. Otherwise, the method ends.

At 810, the user may propose a link between the first search query, the second search query, and/or the concept retrieved from the second search query. The link may be of any suitable type such as synonym or temporal, for example. Since this method applies to the general user model, the proposed link may only be formalized upon exceeding a mathematical threshold of user proposals.

Thus at 812, the number of proposals affirming the link may be compared to a threshold. If the number of proposals exceeds the threshold the method moves to 814. Otherwise, the method ends.

At 814, the link between the first and second search queries and/or the retrieved concept may be formalized and the knowledge structure may be updated.

It will be appreciated that a user may be provided the opportunity to propose to break the link between the second search query and the retrieved concept and may provide additional search queries to retrieve additional matching concepts.

Returning to 804, if a concept is retrieved based on the first search query, the method may move to 816.

At 816, the user may be prompted to break the link between the search query and the retrieved concept. A user may choose to break a link between two concepts if the user disagrees with the link, for example. If the user chooses to break the link between the first search query and the concept the method moves to 818. Otherwise, the method ends.

At 818, the user may propose to break the link between the first search query and the retrieved concept. Since this method applies to the general user model, the proposed break may only be formalized upon exceeding a mathematical threshold of user proposals.

Thus at 820, the number of proposals to break the link may be compared to a threshold. If the number of proposals exceeds the threshold the method moves to 822. Otherwise, the method ends.

At 822, the link between the first search query and the retrieved concept may be formalized and the knowledge structure may be updated.

Returning to 804, if a concept is not retrieved based on the first search query a user may be presented with several knowledge structure maintenance options. First at 824, the user may enter a second search query in an attempt to retrieve a concept via the knowledge structure. At 826, it may be determined if a concept is retrieved that relates to the second search query. If a concept is retrieved, the method moves to 828. Otherwise, the method ends.

At 828, the user may propose a link between the first search query and the second search query. In one example, the link may be a synonym link. As another example, the link may be a temporal link. Further, the number of proposals for the link may be compared to a threshold at 830. If the number of proposals exceeds the threshold the method moves to 832. Otherwise, the method ends.

At 832, the link may be formalized between the first and second search queries and the knowledge structure may be updated.

Returning to 804, if a concept is not retrieved based on the first search query a user may be prompted to add a new concept based on the search query at 834. If is determined that the user decides to add a new concept, the method moves to 836. Otherwise, the method ends.

At 836 the user may propose that a new concept be added to the knowledge structure based on the first search query. The number of proposals may be compared to a threshold at 838. If the number of proposals exceeds the threshold the method moves to 840. Otherwise, the method ends.

At 840, the addition of the new concept may be formalized and the knowledge structure may be updated.

The above method may facilitate improved searching based on concept mapping that may be continuously updated based on the preference of the users. The general user model may enable the knowledge structures to be refined based on the overall preference of the general user population. In this way, concept searching and linking concept may be improved, namely, by tailoring the conceptual mapping as desired by the general population.

It should be understood that the knowledge structures are relationships between concepts. The relationships may be temporal in nature, may be semantically related (such as synonymous), and/or a combination thereof.

Figure 9:
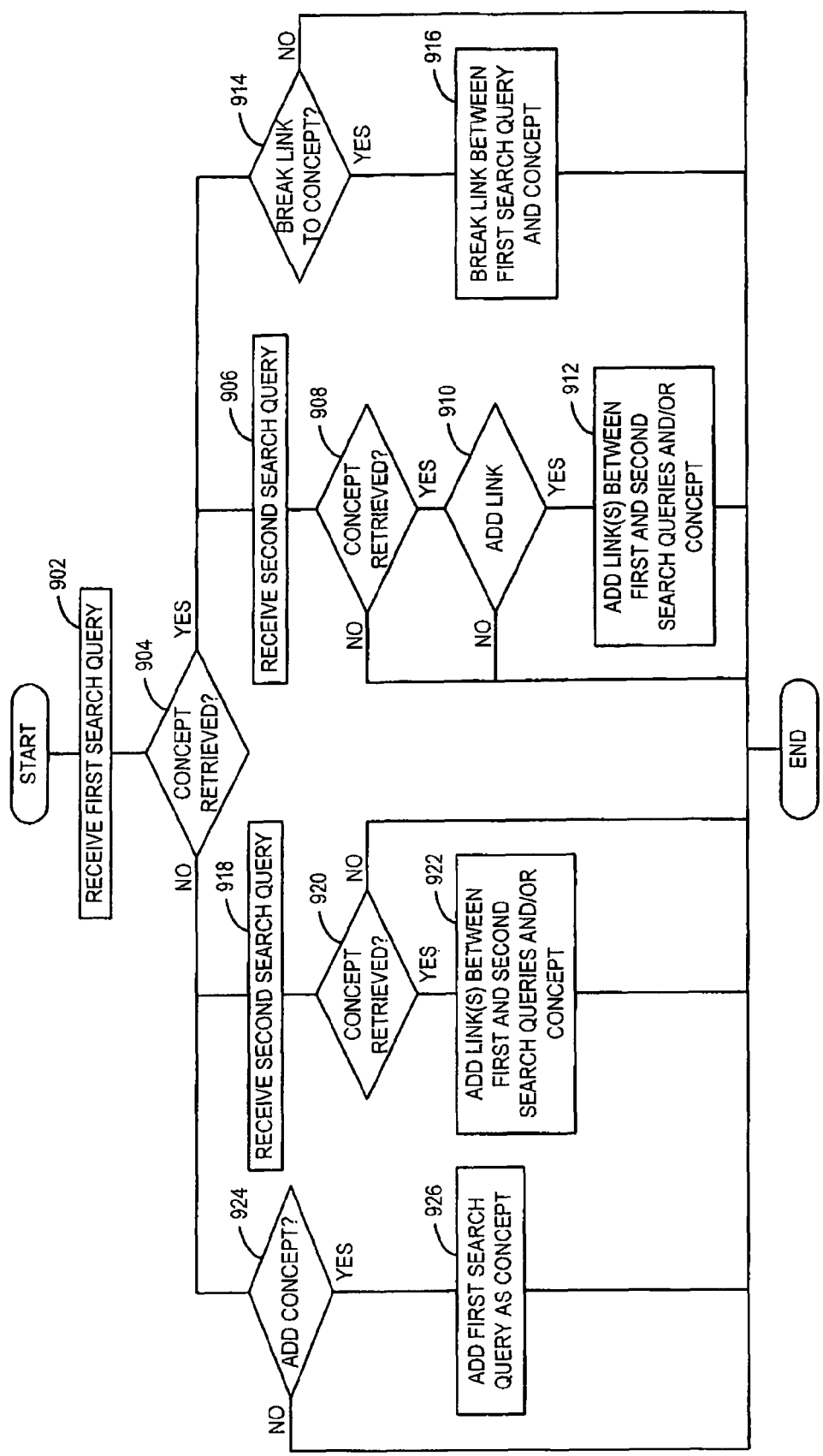
FIG. 9 shows an example flow diagram for creating and managing knowledge structures in a trusted user model.

FIG. 9 shows an exemplary method for creating and managing knowledge structures according to the above described trusted user model. In the present example, the method may be applied to concept searching, such as for example searching performed by a search engine. The method may be performed similarly to the method described in FIG. 8, however adding new concepts as well as confirming and breaking links between concepts may not be based on mathematical formalization, but rather may be based on the individual preference of each trusted user.

The method begins at 902, where a first search query may be received. As discussed above the search query typically may be a text string, however it will be appreciated that the query may take other forms.

Next at 904, the search query may be filtered through the knowledge structures in an attempt to retrieve a related concept. If a concept is retrieved the method moves to 906. Otherwise, a concept is not retrieved and the method moves to 824.

Upon retrieving a concept that relates to the first search query, a user may be presented with several knowledge structure maintenance options. First at 906, the user may be prompted to enter a second search query based on the retrieved concepts from the first search query. At 908, the second search query may be filtered through the knowledge structures in an attempt to retrieve a related concept. If a concept is retrieved, the method moves to 910. Otherwise, the method ends.

At 910, the trusted user may be provided with the option to add one or more links (e.g. different relationship types) between the first search query, the second search query, and the retrieved concepts. If the user chooses to add a new link the method moves to 912. Otherwise, the method ends.

At 912, the link(s) between may be added between the first search query, the second search query, and/or the retrieved concepts. The link(s) may be formalized immediately since the trusted user model does not require additional reinforcement from the user populace.

Returning to 904, upon retrieval of a concept based on the first search query, the trusted user may be provided the option to break the line between the concept and the first search query at 904. If the trusted user chooses to break the link the method moves to 916. Otherwise, the method ends.

At 916, the link between the first search query and the retrieved concept may be broken (or removed). The change in the knowledge structure may be made immediately since the trusted user model does not require additional reinforcement from the user populace.

Returning to 904, if a concept is not retrieved based on the first search query a user may be presented with several knowledge structure maintenance options. First at 918, the user may be prompted to enter a second search query in an attempt to retrieve a concept via the knowledge structure. At 920, it may be determined if a concept is retrieved that relates to the second search query. If a concept is retrieved, the method moves to 922. Otherwise, the method ends.

At 922, it may be determined if the user chooses to add a link (e.g. a temporal link and/or a synonym type link) between the first search query and the second search query. If the user chooses to add a link the method moves to 924. Otherwise, the method ends.

At 924, the link between the first search query and the second search query may be formalized immediately since the trusted user model does not require additional reinforcement from the user populace.

Returning to 904, if a concept is not retrieved based on the first search query a trusted user may be provided with the option to add the first search query as a new concept in the knowledge structure. If the trusted user chooses to add a new concept the method moves to 928. Otherwise the method ends.

At 928, the first search query may be added as a new concept to the knowledge structures and may be formalized immediately since the trusted user model does not require additional reinforcement from the user populace.

The above method may facilitate improved searching based on concept mapping that may be continuously updated based on the preference of the users. The trusted user model may enable the knowledge structures to be refined based on the preferences of each of the trusted users. As discussed above, the trusted user model may make use of the individual expertise of each trusted user in various subjects to improve the concept mapping of the knowledge structures. In this way, concept searching and linking concept may be improved, namely, by tailoring the conceptual mapping as desired by each of the trusted users.

Furthermore, it will be appreciated that in some embodiments the methods described above and shown in FIG. 8 and FIG. 9 may be combined for a hybrid model. In such a model, trusted users may modify the knowledge structures immediately whereas general users may make proposed changes that require a threshold amount to formalize the changes to the knowledge structures.

Figure 10:
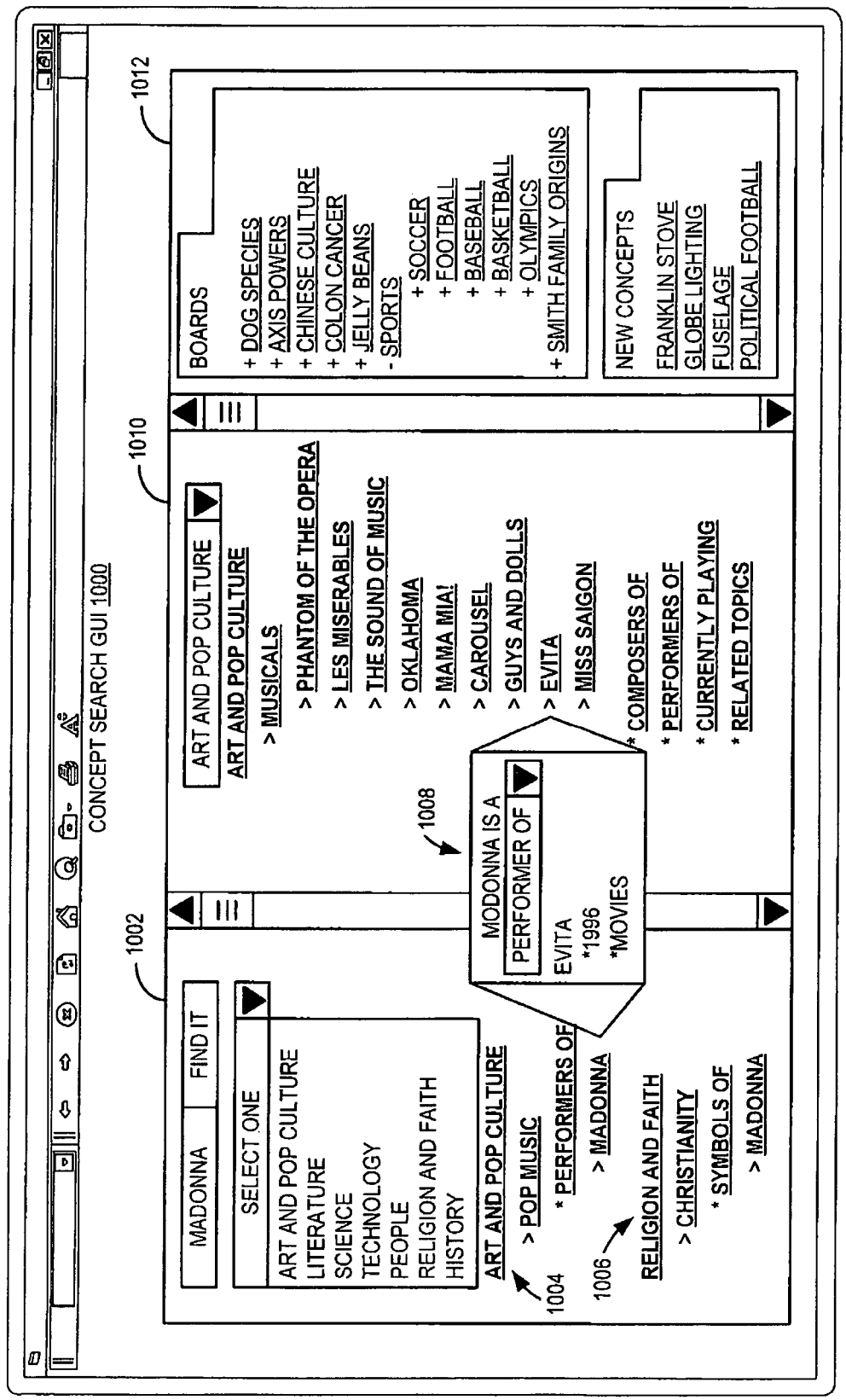
FIG. 10 shows an example conceptual search graphic user interface depicting concepts linked according to knowledge structures of the knowledge structure creation and management system.

FIG. 10 shows an exemplary embodiment of a concept search graphical user interface 1000 that may be generated by a knowledge structure creation and management system. It should be appreciated that the illustrated embodiment is purely exemplary and the knowledge structure creation and management system may include other presentation formats without departing from the scope of the disclosure. For example, the search interface may include separate pages for each concept, a plurality of drop down menus that include various search terms, and other suitable components pertaining to the search process.

As shown at 1002, a first example section shows a search queried for the concept of "Madonna". The knowledge structure creation and management system may include a drop down menu offering a variety of concepts which relate to the search term. A first search path (or concept map) 1004 shows that the concept of "Art and Pop Culture" includes a sub-type of "Pop Music" which includes the relationship type "Performers of" which is linked to the concept "Madonna". A second search path 1006 includes the concept "Religion and Faith" which includes a sub a sub-type of "Christianity" which includes the relationship type "Symbols of" which is linked to the concept "Madonna".

Furthermore, the concept "Madonna" may be linked to other concepts through other relationship types. For example, as shown at 1008, the concept "Madonna" includes the relationship type "Performer of" which links to the concept "Evita" which is a sub-type of "Movies" and which is additionally linked by the sub-type "1996".

Additionally, as shown in a second example section 1010, the concept "Evita" is a sub-type of "Musicals" which is a sub-type of "Art and Pop Culture". The concept "Evita" further may be linked to other concepts via different relationship types, namely, "Composers of", "Performers of", "Currently Playing", and "Related Topics" for example.

The illustrated embodiment further includes a third section 1012 that may include "Boards" and "New Concepts" portions (e.g. thumbnails) which include various concepts and sub-types of concepts. In some embodiments, the "Boards" portion may provide a list of the most searched concepts. In some embodiments, the "New Concepts" portion may provide recently added concepts and/or links between concepts.

As described above, some knowledge structures may be organized such that concepts may be linked temporally. As one example, concepts may be organized in chronological representations (e.g. timelines). The chronological representations may detail all related events including large events and sub-events that pertain to the focused (or searched) event. By organizing the different events into chronological representations the presentation of temporally linked concepts may be configured in an intuitive format.

The temporal knowledge structures may be modified as discussed above using general user, trusted user and hybrid models. In particular, a user, when combined with other users, may be able to contribute to the linkages between events. By the same token, a user might be able to challenge a relationship, and with other user's challenges may break the temporal relationship (or link) between events.

Furthermore, it will be appreciated that the knowledge structures may be searched according to both concept and time. In particular, temporal searching may be conducted by changing the granularity of a timeline to search for events over different or varying periods of time. Further, retrieved events may also have relationships with different concepts which may be presented to the user.

Figure 11:
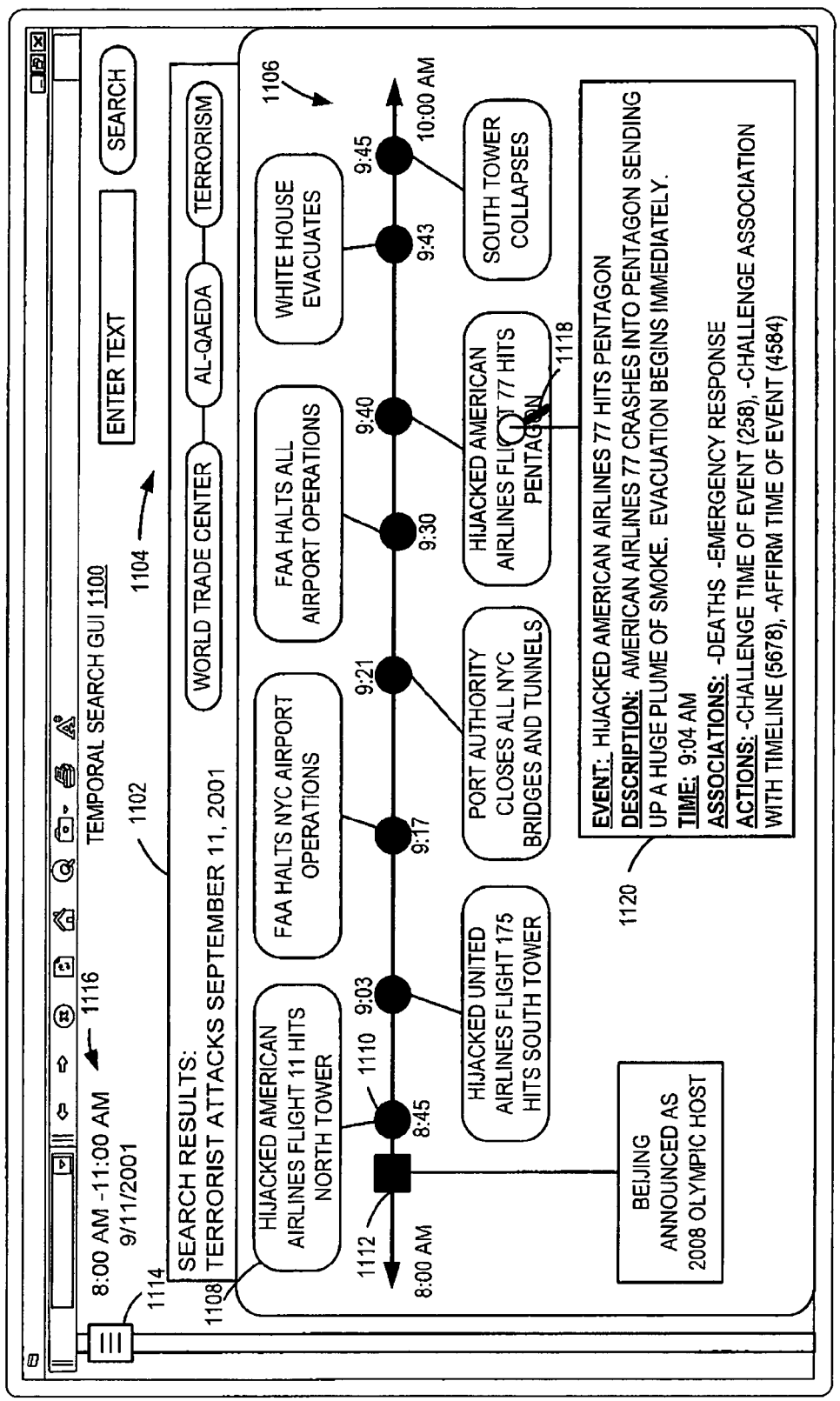
FIG. 11 shows an example graphic user interface depicting concepts linked temporally on a timeline according to knowledge structures of the knowledge structure creation and management system.

FIG. 11 shows an exemplary embodiment of a temporal search graphical user interface 1100 that may be generated by a knowledge structure creation and management system. In the illustrated embodiment, a user may enter search queries into a text field and the query may be applied to the temporal knowledge structures to return a concept in the search results field 1102. The search results 1102 may return a main concept or event and further may retrieve sub-concepts 1104 linked to the main concept. In some embodiments, the sub concepts may be retrieved based on the strength of the link between the concepts established by the user of the knowledge structure creation and management system.

The temporal search graphical user interface 1100 may be configured to present a temporal representation (e.g. timeline) 1106 that corresponds with the search results 1102. The temporal representation 1106 may include a plurality of sub-events (or sub-concepts) that may be mapped to the main concept. In the illustrated embodiment, sub concepts may be depicted as circles on the timeline. Each of the sub-events may include an event description 1108 and a time stamp 1110. Further, the temporal representation 1106 may include concepts that do not necessarily relate to the main concept or may have a statistically weak relationship with the main concept, yet take place in the span of the temporal representation (e.g. timeline). In the illustrated embodiment, the conceptually unrelated event 1112 is depicted as a square on the timeline.

The temporal search graphical user interface 1100 may include a zoom adjustment 1114 depicted as a scrolling bar. The zoom adjustment may be used to control the length the timeline or the granularity of events on the timeline. In the illustrated example, the length of the timeline is set for three hours spanning from 8:00 AM to 11:00 AM on Sep. 11, 2001. Further, the granularity may be set according to the amount of time with events being displayed based on their relationship with the main concept. That is to say, events with strong links to the main concept based on user preference may be displayed over other concepts where applicable.

The zoom adjustment 1114 may be modified to increase or decrease the length of the timeline and the events displayed on the timeline may be adjusted to reflect the strength of the link between concepts. For example, the timeline may be zoomed in to a length of one hour which may eliminate certain events from being displayed that do not fall within the particular time span. Further, additional events may be displayed to account for the adjustment in granularity.

The temporal search graphic user interface 1100 may include a detail display tool 1118 that may be configured to display additional event information 1120 upon selecting an event on the timeline. The display tool may generate a pop-up display that presents event information as well as system management information. For example, event information 1120 may include different timeline elements, such as for example, the title of the event, a description of the event, the time and date of the event, conceptual links to other events, and pending system actions on the event. Pending actions on the event may correspond to the management methods described in FIG. 8. In one particular example, a timeline element for a particular event may present the number of challenges to the time of the event, the number of challenges to the link between the event and the main concept, and/or the number of affirmations of the link between the event and the main concept.

The temporal nature of the knowledge structures may be presented in an intuitive manner that facilitates quick and flexible searching due to the vast number of concepts and event that are linked through various relationships.

It will be appreciated that the search aspect of the graphical user interface of FIG. 11 is exemplary. Further, the temporal knowledge structures may be applied to other suitable applications without leaving the scope of the present disclosure. For example, the temporal knowledge structures may be applied to operation logistic, medical history, etc.

Furthermore, it will be appreciated that the temporal knowledge structures may be created and managed according to methods of FIGS. 8 and 9. In particular, the general user and trusted user models may be implemented to modify concepts and relationships between concepts in the knowledge structures as discussed above.

It will be appreciated that the above described knowledge structure creation and management system and various user models may be integrated into other systems. In one example, the knowledge structure creation and management system (using temporal and/or semantic knowledge structures) may be adapted for use by websites and may be integrated into search systems to improve searching. In particular, the knowledge structure creation and management system may enable a website to embed topic-based navigation and search applications into the website. In an exemplary embodiment of the knowledge structure creation and management system, users may navigate a website using temporal navigation and/or topic-based navigation that is dynamically built from relevant strings from various websites, synonymous strings mapped to a specific topic, temporal strings, and/or inter-topic navigation.

Furthermore, knowledge structure management tools may be embedded into website navigation. For example, in some embodiments a user may be prompted to "vote" to affirm or decline concepts returned during a search or to confirm or break links between concepts returned during a search. In one particular example, a user may "vote" to confirm a temporal link between two concepts.

In some embodiments, different knowledge structures may comprise mappings which include elements from various different languages. Furthermore, a single concept may be linked to descriptive character strings from any desired language within a knowledge structure. In such a configuration, conceptual organization may facilitate improved information retrieval and topic browsing, since the system may transcend barriers created by dependence on a single language.

Although exemplary embodiments of the knowledge structure creation and management system have primarily been associated with searching computer systems over a network; it should be appreciated that some embodiments of the knowledge structure creation and management system may be applied to a variety of different applications and environments. For example, in a marketing environment, the knowledge structure creation and management system may facilitate advertising to be sold based on one or more concepts or conceptual links which may be applied in cross product advertising. Furthermore, the knowledge structure creation and management system may facilitate advertising to be sold or rendered based on groups of related concepts.

Another example application of a knowledge structure may be applied to law. In an exemplary application, the knowledge structure creation and management system may include trusted users in the form of legal scholars to collaboratively establish the ontology of federal and state laws. Furthermore, the knowledge structure creation and management system may enable general users (i.e. the public) to navigate to lawyers based on practice specialty. For example, the concept of lawyers may be searched according to a sub-type of relationship, for example real estate law, which may link to the concept of landlord-tenant privacy disputes.

Another example application of a knowledge structure may be applied to automobiles. In an exemplary application, the knowledge structure creation and management system may include trusted users in the form of consumers who are experts in the automobile and auto parts industry to collaboratively establish a repair or replacement parts catalog for classic automobiles. Once the catalog is established, the catalog may be used by auto parts manufacturers to better classify and offer these parts to consumers.

Another example application of a knowledge structure creation and management system may be applied to entertainment. In an exemplary application, the knowledge structure may enable consumers to create and confirm an ontology of all artists and their works, allowing a consistent and complete catalog of topics to drive product sales and information retrieval.

Another example application of a knowledge structure creation and management system may be applied to record keeping. In particular, events may be confirmed in a temporal knowledge structure allowing for an overview of a lifetime of someone or something. More particularly, the temporal knowledge structures may be applied to individuals, businesses, or other entities.

Furthermore, although many examples include searching knowledge structures for information, it should be appreciated that an exemplary knowledge structure system may include functions to create, manage, and remove knowledge structures. Furthermore, it should be appreciated that searching may be a tool utilized in the management of an exemplary knowledge structure system.

The above described applications and environments in which embodiments of the knowledge structure creation and management system may be implemented should be considered purely exemplary. It should be appreciated that the knowledge structure creation and management system may be used to search various systems and concept, as well as take various different formats and configurations without departing from the scope of this disclosure. For example, the knowledge structure creation and management system may be used to search concepts across different subject such as, standing inventories, historical events, sporting statistics, environmental conditions, video content, mathematic equations, etc.

While the present invention has been particularly shown and described with reference to the foregoing preferred embodiments, those skilled in the art will understand that many variations may be made therein without departing from the spirit and scope of the invention. The description of the invention should be understood to include all novel and non-obvious combinations of elements described herein, and claims to any novel and non-obvious combination of these elements.

The invention claimed is:

1. An electronic collaboration method for data stored over a network, the method comprising:
    receiving a user-contributed topic-to-topic proposed relationship linkage between a first search query and a concept from a first user;
    displaying the proposed topic-to-topic relationship linkage for the first search query and the concept;
    establishing a formal collaborative topic-to-topic relationship linkage upon collaboratively-based confirmation of the proposed relationship linkage, wherein the collaboratively-based confirmation comprises a plurality of different users, different from the first user, receiving a plurality of proposals of the user-contributed proposed relationship linkage between the first search query and the concept, the plurality of proposals exceeding a predefined mathematical threshold, and affirming the proposed relationship linkage between the first search query and the concept when the plurality of proposals exceed the predefined mathematical threshold to form the formal collaborative topic-to-topic relationship linkage;
    displaying the formal collaborative topic-to-topic relationship linkage;
    removing the proposed relationship linkage upon receiving a challenge to the proposed relationship linkage in accordance with breaking relationship criteria; and
    continuously managing the formal collaborative topic-to-topic relationship linkage based on additional collaboratively-based confirmations.

2. The method of claim 1, wherein the proposed relationship linkage is a semantic relationship between the first search query and the concept.

3. The method of claim 1, wherein the proposed relationship linkage is a synonymic relationship between the first search query and the concept.

4. The method of claim 1, wherein the proposed relationship linkage is a temporal relationship between the first search query and the concept and where the first search query and the concept are displayed in a graphical representation of a timeline.

5. The method of claim 4, further comprising adjusting a length of the timeline based on input received from a scroll bar.

6. The method of claim 4, further comprising graphically adjusting the concepts displayed on the timeline to reflect a strength of the link between the first search query and the concept.

7. The method of claim 1, further comprising storing the formal collaborative topic-to-topic relationship linkage.

8. The method of claim 1, further comprising establishing a plurality of formal relationship linkages with one of the first search query and the concept.

9. The method of claim 8, displaying a graphical representation of the formal relationship linkages of the first search query and the concept.

10. The method of claim 9, wherein the proposed relationship linkage is a temporal linkage and where displaying a graphical representation of the formal relationship linkage includes displaying a timeline including the first search query and the concept where the first concept search query is displayed on the timeline based on a temporal relationship in a first position on the timeline and the concept is displayed in a second position on the timeline.

11. The method of claim 1, further comprising removing the proposed relationship linkage when a number of received challenges exceeds a mathematical threshold.

12. An electronic collaboration method for display of a temporal search graphical user interface generated by a knowledge structure creates and management system, the method comprising:
    receiving a first search query;
    retrieving and displaying on a graphical timeline a concept related to the first search query and one or more sub-concepts, where the subconcepts are retrieved and displayed based on a strength of the link between the concept and the sub-concepts and where the strength of the link is based on a formal temporal collaborative topic-to-topic linkage determined via an affirmation method comprising:
        receiving a user-contributed proposed temporal linkage between a first concept and a second concept from a first user;
        displaying the proposed temporal linkage for the first concept and the second concept;
        establishing a formal temporal collaborative topic-to-topic linkage upon collaboratively-based confirmation of the proposed temporal linkage, wherein the collaboratively-based confirmation comprises a plurality of additional users, different from the first user, proposing the proposed temporal linkage between the first concept and the second concept, and affirming the proposed relationship linkage between the first and second concepts.

13. The method of claim 12, wherein the proposed temporal linkage further comprises a semantic and/or synonymic relationship between the concepts.

14. The method of claim 12, wherein the collaboratively-based confirmation includes receiving affirmation of the proposed temporal linkage from a plurality of users in accordance with a predefined mathematical threshold.

15. The method of claim 12, further comprising storing the formal temporal linkage.

16. The method of claim 12, wherein displaying the proposed temporal linkage for the first concept and the second concept includes displaying a timeline where the first concept and the second concept are positioned on the timeline based on the proposed temporal linkage.

17. The method of claim 12, further comprising:
managing the user-contributed proposed temporal linkage automatically, wherein the user-contributed proposed temporal linkage is confirmed as a formal temporal collaborative topic-to-topic linkage or the user-contributed proposed temporal linkage is challenged.

18. An electronic collaboration method for data stored over a network, the method comprising:
receiving a user-contributed topic-to-topic proposed relationship linkage between a first search query and a concept from a first user;
displaying the proposed topic-to-topic relationship linkage for the first search query and the concept;
establishing a formal collaborative topic-to-topic relationship linkage upon collaboratively-based confirmation of the proposed relationship linkage, wherein the collaboratively-based confirmation comprises a plurality of different users, different from the first user, receiving a plurality of proposals of the user-contributed proposed relationship linkage between the first search query and the concept, the plurality of proposals exceeding a predefined mathematical threshold, and affirming the proposed relationship linkage between the first search query and the concept when the plurality of proposals exceed the predefined mathematical threshold to form the formal collaborative topic-to-topic relationship linkage;
displaying the formal collaborative topic-to-topic relationship linkage; and
managing the user-contributed proposed temporal linkage automatically, wherein the user-contributed proposed relationship linkage is confirmed as a formal collaborative topic-to-topic relationship linkage or the user-contributed proposed relationship linkage is challenged.

* * * * *

UNITED STATES PATENT AND TRADEMARK OFFICE
CERTIFICATE OF CORRECTION

PATENT NO. : 8,843,475 B2  
APPLICATION NO. : 11/827563  
DATED : September 23, 2014  
INVENTOR(S) : Philip Marshall Page 1 of 1

It is certified that error appears in the above-identified patent and that said Letters Patent is hereby corrected as shown below:

In the Claims

Col. 18, line 37, please delete the word "concept" that appears between "the first" and "search query is displayed on the timeline".

Signed and Sealed this  
Sixteenth Day of June, 2015

Michelle K. Lee  
*Director of the United States Patent and Trademark Office*